United States Patent [19]
Park

[11] Patent Number: 5,952,078
[45] Date of Patent: Sep. 14, 1999

[54] ATHLETIC GUARD INCLUDING ENERGY ABSORBING LAMINATE STRUCTURE

[76] Inventor: Andrew D. Park, 2851 E. Brigstock Rd., Midlothian, Va. 23113

[21] Appl. No.: 09/014,540

[22] Filed: Jan. 28, 1998

Related U.S. Application Data

[63] Continuation-in-part of application No. 08/850,593, May 2, 1997, which is a continuation-in-part of application No. 08/506,991, Jul. 28, 1995, Pat. No. 5,635,288, which is a continuation-in-part of application No. 08/243,976, May 17, 1994, Pat. No. 5,437,905.

[51] Int. Cl.$^6$ .................................................. B32B 5/12
[52] U.S. Cl. .......................... 428/105; 428/113; 428/114; 428/408; 428/911
[58] Field of Search .................. 428/105, 113, 428/114, 408, 911

[56] References Cited

U.S. PATENT DOCUMENTS

| | | |
|---|---|---|
| 3,322,613 | 5/1967 | Rasmussen . |
| 3,439,865 | 4/1969 | Port et al. . |
| 3,719,545 | 3/1973 | Lawler . |
| 4,079,161 | 3/1978 | Kile . |
| 4,090,005 | 5/1978 | Morgan . |
| 4,181,768 | 1/1980 | Severin . |
| 4,186,648 | 2/1980 | Clausen et al. . |
| 4,213,812 | 7/1980 | Boultinghouse . |
| 4,309,487 | 1/1982 | Holmes . |
| 4,428,998 | 1/1984 | Hawkinson . |
| 4,466,135 | 8/1984 | Coppage, Jr. . |
| 4,510,200 | 4/1985 | Samowich . |
| 4,678,702 | 7/1987 | Lancaster et al. . |
| 4,916,000 | 4/1990 | Li et al. . |
| 4,953,234 | 9/1990 | Li et al. . |
| 5,173,138 | 12/1992 | Blauch et al. . |
| 5,677,029 | 10/1997 | Prevorsek et al. . |

FOREIGN PATENT DOCUMENTS

| | | |
|---|---|---|
| 0 169 432 | 1/1986 | European Pat. Off. . |
| 0 572 965 A1 | 12/1993 | European Pat. Off. . |
| 0 683 374 A1 | 11/1995 | European Pat. Off. . |
| WO 94/09336 A1 | 4/1994 | WIPO . |

OTHER PUBLICATIONS

Nonwovens Industry, *Technical Nonwovens, Bitting the Bullet: New Nonwoven Finding Application in Ballistic Protection;* Apr. 1991; all submitted pages; Nonwovens Industry.
Congress of The United States Office of Technology Assessment; *Police Body Armor Standards and Testing;* vol. 1: Report; no date provided; all submitted pages, vol. 1; United States Government; U.S.A.; Office of Technology Assessment.

*Primary Examiner*—Rich Weisberger
*Attorney, Agent, or Firm*—Adams Law Firm, P.A.

[57] ABSTRACT

An athletic guard shaped to fit against a body part is provided for protecting the body part from injury. The athletic guard includes an energy absorbing laminate structure. The laminate structure includes a first array of high performance, unidirectionally-oriented fiber bundles. A second array of high performance, unidirectionally-oriented fiber bundles are cross-plied at an angle with respect to the first array of fiber bundles, and laminated to the first array of fiber bundles in the absence of adhesives or bonding agents. First and second polymeric films are bonded to outer surfaces of the laminated first and second arrays of unidirectional fiber bundles without penetration of the films into the fiber bundles or through the laminate from one side to the other. A sufficient amount of film resides between the laminated first and second arrays of unidirectional fiber bundles to adhere the first and second arrays of fiber bundles together to form the laminate structure.

8 Claims, 8 Drawing Sheets

(PRIOR ART)

ATHLETIC GUARD INCLUDING ENERGY ABSORBING LAMINATE STRUCTURE

TECHNICAL FIELD AND BACKGROUND OF THE INVENTION

This application is a continuation-in-part of U.S. Ser. No. 08/850,593 filed on May 2, 1997, which is a continuation-in-part of U.S. Ser. No. 08/506,991 filed on Jul. 28, 1995, now U.S. Pat. No. 5,635,288, which is a continuation-in-part of U.S. Ser. No. 08/243,976 filed on May 17, 1994, now U.S. Pat. No. 5,437,905.

The invention relates to an athletic guard incorporating a light weight, energy absorbing and impact resisting laminate structure. The athletic guard is applicable for protecting a body part from injury, and for shielding existing injuries against further harm.

Prior art laminates suitable for use in athletic guards have been constructed of numerous fibers, including polyethylene, polyolefin and aramid fibers. Many such laminates are woven of various fibers, such as aramid fibers sold under the trademark KEVLAR.

One non-woven laminate used in the ballistic industry is referred to by the trademark SPECTRA-SHIELD owned by Allied-Signal, Inc. This laminate is incorporated primarily in soft body armor to protect the wearer against high-velocity bullets and fragments. SPECTRA-SHIELD is made by first forming a non-woven unidirectional tape composed of unidirectional polyethylene fibers, and an elastic resin material that holds the fibers together. The resin penetrates to the filament level, impregnating the entire structure with the resin product. Two layers, or arrays, of the unidirectional tape are then laminated together (cross-plied) at right angles to form a panel. The panel is then covered on both sides with a thin film of polyethylene on the order of 0.001 inches thick. The film prevents adjacent panels from sticking together when the panels are layered together. The layered panels form an impact resistant, soft body armor product.

The present invention relates to an improved non-woven laminate structure for a body protective athletic guard. Enhanced energy absorption and distribution characteristics are obtained while optimizing use of materials in the laminate. Specifically, it has been determined that such laminates can be constructed of high performance fibers without using resins to hold the fibers together. This substantially reduces the weight of the structure without compromising its impact-absorbing characteristics. As used in this application, the term "high performance fiber" refers to fibers having a tensile strength greater than 7 grams per denier.

By omitting the resin, the cross-plied arrays of fibers directly contact each other, instead of being encapsulated and therefore separated from each other by the resin. An ultra-thin film is used both to cover the cross-plied arrays and to hold the arrays to each other.

The prior art teaches that a critical limit of 80% fiber must be maintained in the laminate in order to maintain product integrity. If the percentage of resin, covers, and the like exceeds 20%, the impact-absorbing qualities of the laminate begin to degrade.

This invention incorporates certain features heretofore recognized as being only applicable to older, low performance fibers into the field of high performance fibers in order to achieve a light-weight laminate structure for use in an athletic guard with enhanced energy absorbing and distributing characteristics.

SUMMARY OF THE INVENTION

Therefore, it is an object of the invention to provide an athletic guard which incorporates a light weight laminate structure.

It is another object of the invention to provide an athletic guard which provides enhanced energy absorbing and impact resisting characteristics.

It is another object of the invention to provide an athletic guard which is relatively inexpensive to manufacture.

It is another object of the invention to provide an athletic guard which is relatively easy to assemble.

These and other objects of the present invention are achieved in the preferred embodiments disclosed below by providing an athletic guard shaped to fit against a body part for protecting the body part from injury. The athletic guard includes an energy absorbing laminate structure. The laminate structure includes a first array of high performance, unidirectionally-oriented fiber bundles. A second array of high performance, unidirectionally-oriented fiber bundles are cross-plied at an angle with respect to the first array of fiber bundles, and laminated to the first array of fiber bundles in the absence of adhesives or bonding agents. First and second polymeric films are bonded to outer surfaces of the laminated first and second arrays of unidirectional fiber bundles without penetration of the films into the fiber bundles or through the laminate from one side to the other. A sufficient amount of film resides between the laminated first and second arrays of unidirectional fiber bundles to adhere the first and second arrays of fiber bundles together to form the laminate structure.

According to one preferred embodiment of the invention, the first array of fiber bundles is cross-plied at an angle of 90 degrees to the second array of fiber bundles.

According to another preferred embodiment of the invention, the first and second thermoplastic films are polyethylene film having a thickness of 0.35 mils.

According to yet another preferred embodiment of the invention, the weight of the high performance fibers in the laminate structure is at least 80 percent of the total weight of the laminate.

According to yet another preferred embodiment of the invention, the first and second arrays of high performance, unidirectionally-oriented fiber bundles include fibers chosen from the group consisting of aramid fiber, ultra high molecular weight polyethylene, high molecular weight polyethylene, high modulus vinylon, and liquid crystal polymer-based fiber.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figures 1, 2:
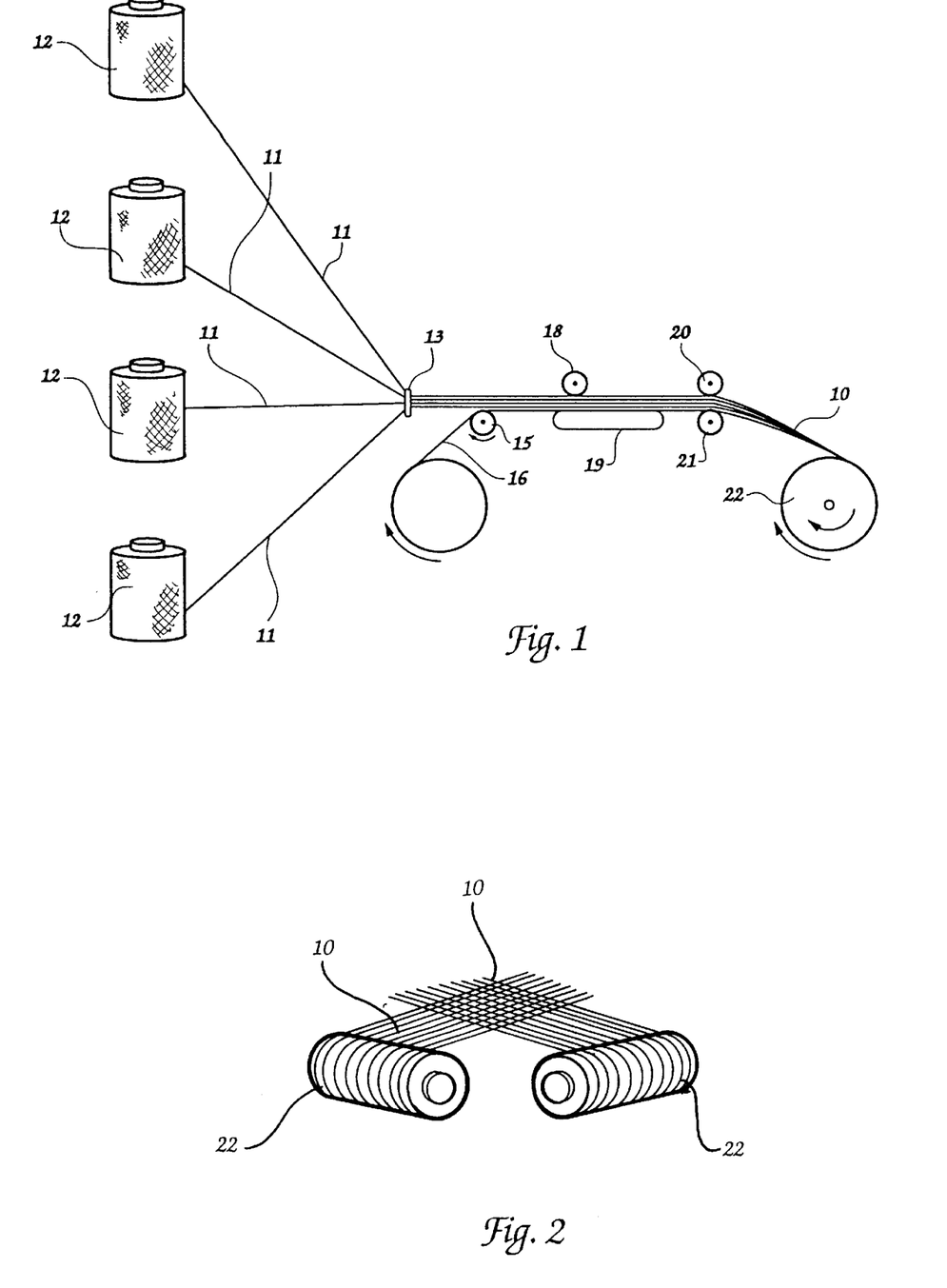
FIG. 1 is a simplified flow diagram of the process of fabricating a laminate structure in sheet form for use in an athletic guard according to a preferred embodiment of the invention.
FIG. 2 illustrates formation of the laminate structure from two identical laminate sheets.

Referring now specifically to the drawings, an energy absorbing and impact resisting laminate structure in sheet form for use in an athletic guard according to the present invention is illustrated in FIG. 1 and shown generally at reference numeral 10. The sheet 10 is created according to the process illustrated in FIG. 1, and described in detail below.

A plurality of bundles 11 of untwisted high performance fibers are first formed into an array. The bundles 11 may be supplied from separate creeled yarn packages 12, as shown in FIG. 1, or may be supplied from a warp beam (not shown). The fibers in the bundles 11 are unidirectional, and the bundles 11 are passed through a comb guide 13 where the fiber bundles 11 are further parallelized and formed into an array having a predetermined uniform number of bundles 11 per inch of width.

A single layer of fiber bundles 11 are arrayed, and then passed over a film application roller 15 where a thin polyethylene film 16 is applied to one side of the array of fiber bundles 11. A pre-lamination roller 18 presses the array of fiber bundles 11 onto the film 16, which is supported on a heated platen 19. After heating, the fiber bundles 11 and the attached film 16 are laminated by passing them through a pair of heated nip rolls 20, 21. The assembled laminate structure is then wound onto a take-up beam 22.

Figure 3:
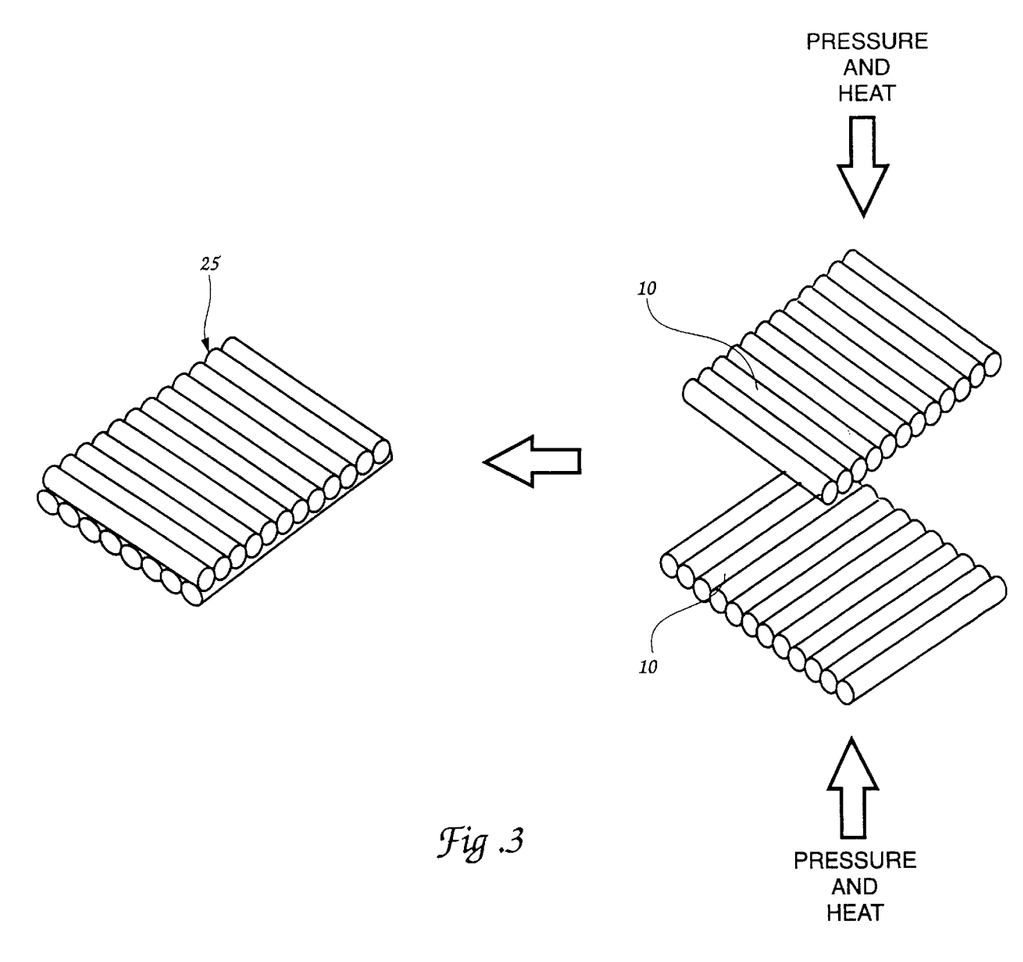
FIG. 3 further illustrates formation of the laminate structure from two identical laminate sheets.

Referring now to FIG. 2, two layers, or plies, of the sheet 10 are bonded to each other with the direction of the fiber bundles at 90 degree angles to each other. Other cross ply angles are possible, such as 45 degree. The sheets 10 are layered with the respective polyethylene films 16 on the outside, so that substantially uncoated high performance fibers are in contact with each other. As is illustrated in FIG. 3, the bonding occurs by further heating of the sheets 10 so that the films 16 remelt.

The films 16 are extremely thin, preferably on the order of 0.35 mils, so that the films 16 will slightly coat the exterior surfaces of the individual fiber bundles 11, but will not penetrate into the fiber bundles 11 so to coat and encapsulate the individual fibers and filaments. Sufficient plasticized film material 16 flows between the adjacent cross-plied arrays of fiber bundles 11 to bond the two fiber bundles 11 together to form a laminate structure 25.

Figure 4:
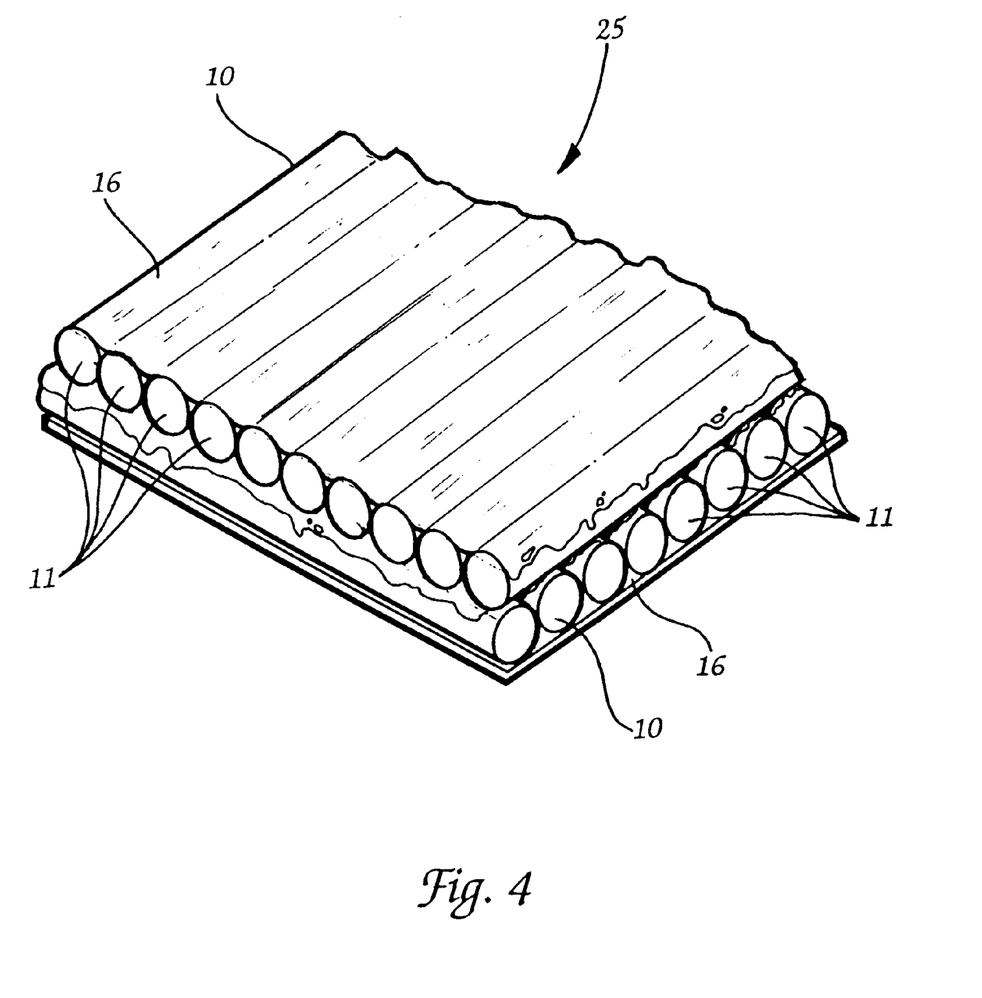
FIG. 4 is an enlarged, diagrammatic representation of the interaction of the thin covering films and the unidirectional fiber arrays of the laminate structure.

As is shown in FIG. 4, the fiber bundles 11 of each of the sheets 10 are at right angles to each other. The outer surface of each of the sheets 10 are coated with the film 16. As is illustrated, the film 16 has melted and flowed into the interstices between the fiber bundles 11 of each of the sheets 10. Sufficient melted polyethylene from both of the films 16 have intermingled with each other and coated the outer surface of the fiber bundles 11 of the other sheet 10 to create a surface bond to hold the two sheets 10 together to form the laminate structure 25.

Figure 5:
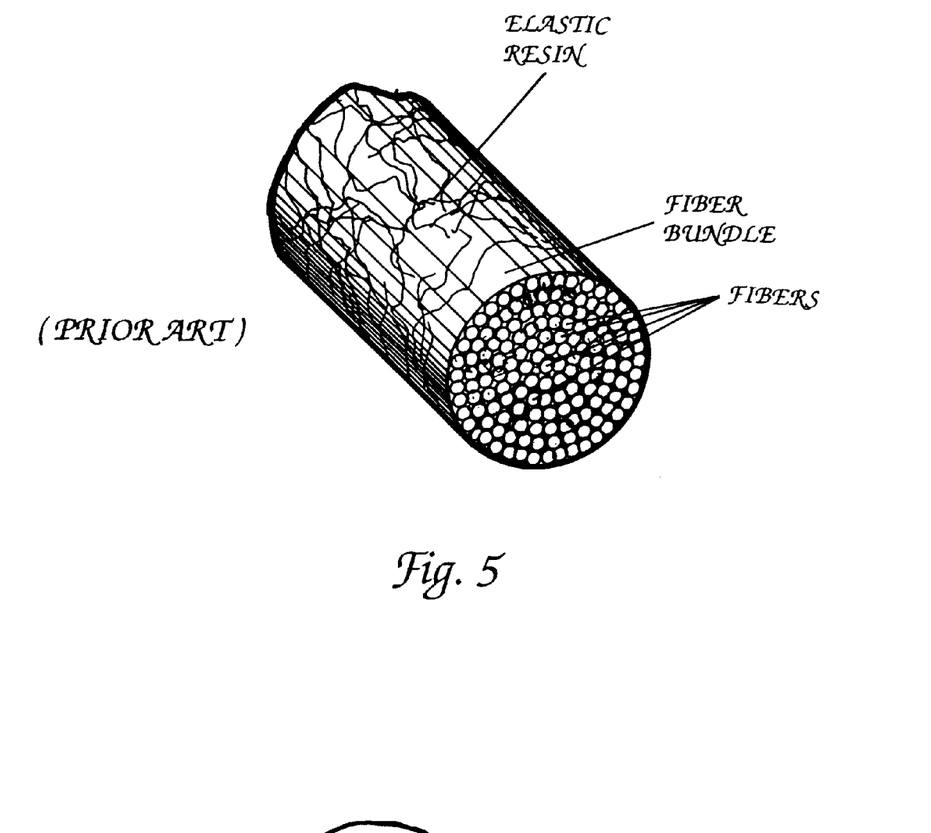
FIG. 5 is an enlarged view of a single fiber bundle according to the prior art, showing complete impregnation of the resin into the structure of the fiber bundle.
Figure 6:
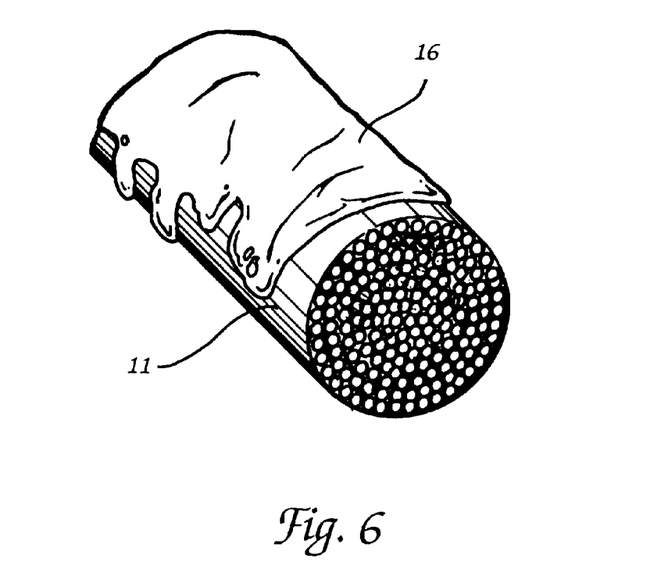
FIG. 6 is a enlarged view of a single fiber bundle according to an embodiment of the invention showing lack of impregnation of the resin into the structure of the fiber bundle.

This is illustrated more clearly in FIGS. 5 and 6. FIG. 5 shows a prior art construction such as a SPECTRA-SHIEID product using both an elastic resin and a surface film. The individual fiber bundles and the individual fibers which make up the bundle are substantially completely encapsulated with the elastic resin (the black, surrounding material) as well as the outside of the fiber bundle. This adds to the weight of the product and creates the possibility of variation in quality if too much or too little resin is used, or if the resin is applied unevenly or inconsistently.

In contrast, the fiber bundles 11 according to the present invention are coated by the film 16 on the outside surface only, so that the integral structure of parallel, closely bunched filaments and fibers remains intact, and intimate contact between the closely bunched filaments and fibers is maintained. The film 16 may not even coat the entire outer surface of the fiber bundle 11, but only to a sufficient degree to properly bond the two sheets 10 together to form the laminate structure 25. This is also illustrated in FIG. 4.

Although the films 16 of the laminate structure 25 are preferably formed of polyethylene, other polymeric materials such as thermosetting plastics, thermoplastics, or elastomerics may be used. In the case of thermosetting plastics, the film 16 is not filly cured prior to formation of the laminate structure 25. Thus, in its partially cured state, sufficient plasticized film material 16 flows between the adjacent cross-plied arrays of fiber bundles 11 to bond the two fiber bundles 11 together to form a laminate structure 25. The amount of heat and pressure required during lamination is a function of the thickness and other properties of the film 16 being used.

A preferred embodiment is given in the following example:

Fiber—KEVLAR aramid fiber

Fiber construction—840 denier, 1.5 den/fil. per tow.

Sheet Construction—10 ends/inch unidirectional untwisted tows

Number of Sheets in laminate structure—2

Sheet orientation of 1st and 2nd sheets—90 degrees

Film—0.35 mil polyethylene

Laminate structure—intimately plied sheets with overlying, surface-applied polyethylene film Percentage of fiber weight to film weight—80%

In an embodiment particularly applicable when forming wide layers of laminate, such as between 12 and 60 inch widths, one or more fill fibers (not shown) may be woven or stitched into the arrayed fiber bundles 11 prior to forming the laminate structure 25 in order to maintain the unidirectional orientation and structural integrity of the fibers during handling and lamination. The fill fibers may be any commercially available fiber which may or may not be a high performance fiber. The fill fibers may be monofilament, multi-filament, bi-component filament, ribbon, or strips. The term "unidirectional" as used herein refers to the generally parallel orientation of the high-performance fibers in the bundles 11, and does not exclude the inclusion of fill fibers, such as described above, nor does it require that every high-performance fiber be in precise parallel orientation.

The enhanced energy absorbing and impact resisting characteristics of the laminate structure 25 are best illustrated with reference to ballistic resistance, and a comparison of related prior art structures. Although not directly relevant to use of the laminate structure 25 as an athletic guard, the ballistic resistance of the laminate structure 25 is intended to demonstrate the superior ability of laminate structure 25 to receive and absorb an impacting force. This ability is especially applicable to athletic guards of the present invention.

Figure 7:
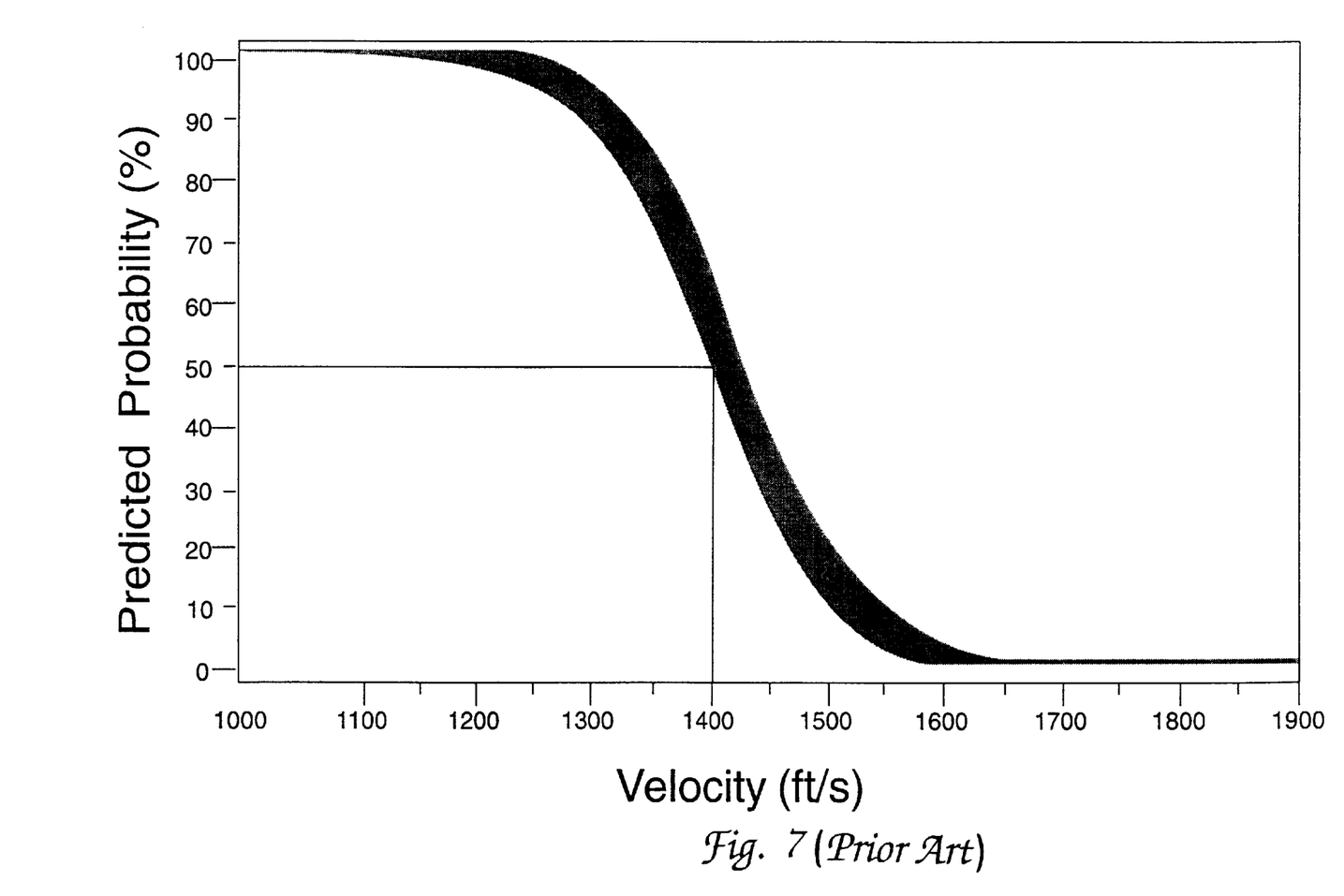
FIG. 7 is a graph showing estimated stopping ability of a prior art aramid (KEVLAR) fabric.

Referring to FIG. 7, the graph illustrates that at the 50% predicted probability level, a standard measure of ballistic efficiency, a prior art fabric constructed of KEVAR 129 fiber will stop a 9 mm round of ammunition traveling at 1400 ft/sec.

Figure 8:
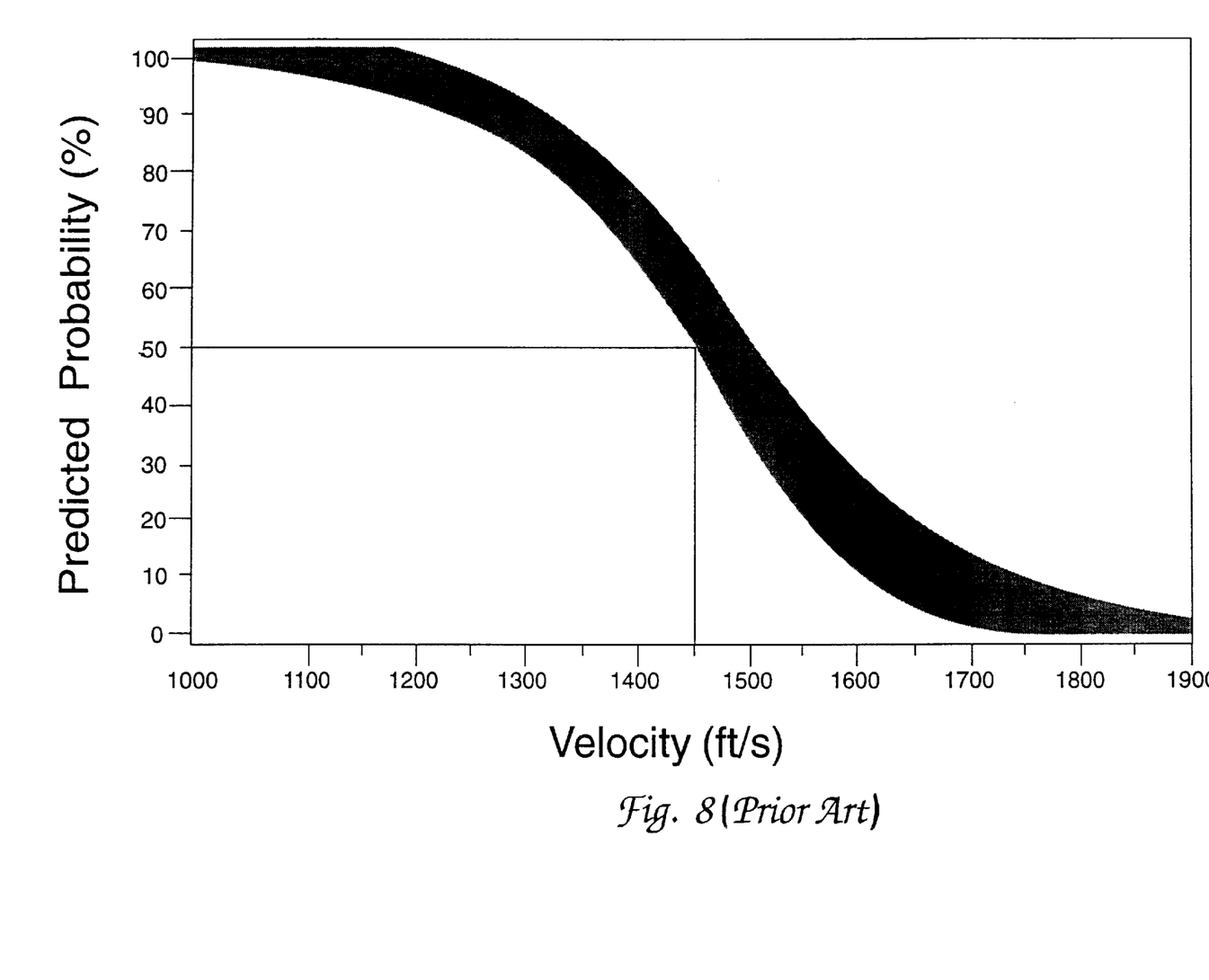
FIG. 8 is a graph showing estimated stopping ability of a prior art SPECTRA-SHIEID polyethylene fabric.

Referring to FIG. 8, the graph illustrates that at the 50% predicted probability level a prior art SPECTRA-SHIELD fabric will stop a 9 mm round of ammunition traveling at 1450 ft/sec.

Figure 9:
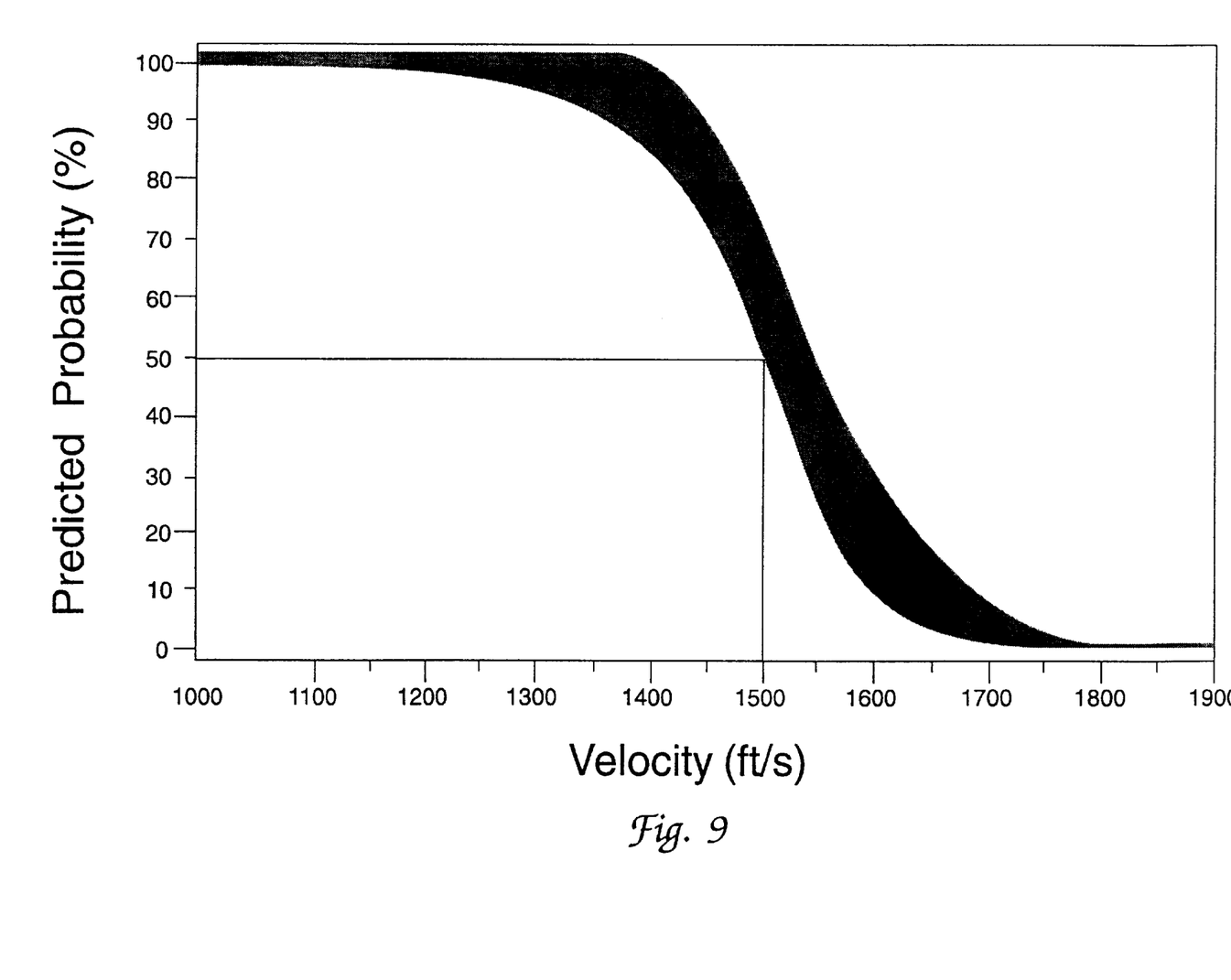
FIG. 9 is a graph showing estimated stopping ability of a aramid fiber (KEVLAR) laminate structure according to a preferred embodiment of the invention.

In contrast, as is shown in FIG. 9, a KEVLAR panel constructed in accordance with an embodiment of the invention will stop a round of 9 mm ammunition traveling at 1500 ft/sec 50 percent of the time. Furthermore, the steeper slope of the graph indicates that at lower velocities, the probability of the round be stopped by the fabric is further improved over the prior art. In addition, the lighter weight of the inventive laminate structure 25, its relative ease of construction and assembly provide further advantages.

The above examples demonstrate characteristics of the present laminate structure 25 with respect to the kinetic energy of a moving object having a predetermined mass and velocity. Thus, the ammunition is representative of any moving object, such as a baseball, hockey puck or stick, and the like.

Figure 10:
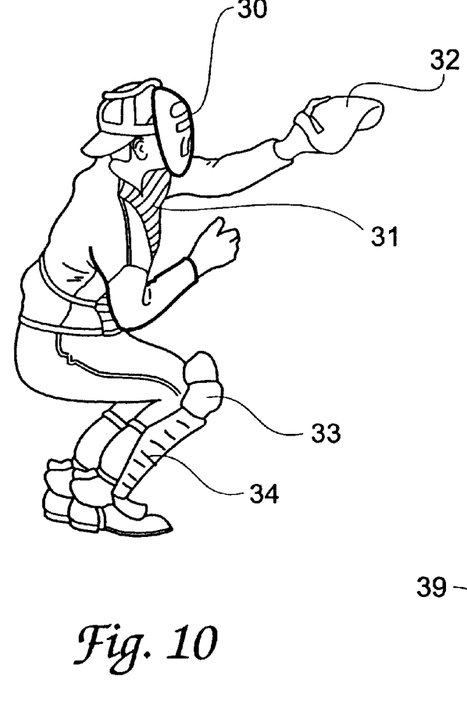
FIG. 10 illustrates several examples of athletic guards incorporating a laminate structure according to one embodiment of the present invention.
Figure 11:
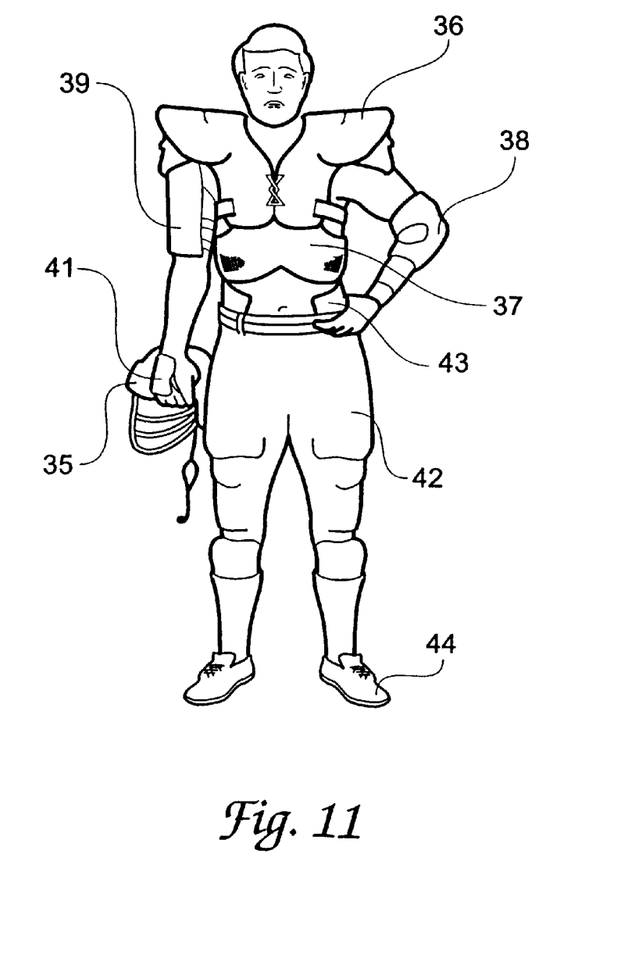
FIG. 11 illustrates additional examples of athletic guards incorporating the laminate structure.

Referring now to FIGS. 10 and 11, multiple sheets of laminate structure 25 may be used alone or in combination with fabric materials, soft foam padding, rigid thermosetting polymerics, and the like to form a body protective athletic guard, such as a catcher's face mask 30, chest protector 31, glove 32, knee guard 33, and shin guard 34, as shown in FIG. 10; or as shown in FIG. 11, a football player's helmet 35, shoulder pads 36, rib pad 37, elbow pad 38, arm pad 39, hand guard 41, thigh pads 42, hip pads 43, and insole protective strip for the heel and toe of cleated shoes 44. Additionally, the laminate structure 25 may be incorporated in other athletic guards (not shown) such as chaps, inner lining for bicycle helmets, and any other related body protective equipment.

For example, the catcher's chest protector 31 illustrated in FIG. 10 preferably incorporates between 10–15 sheets of laminate structure 25 overlaid in substantial registration and enveloped in a cloth jacket. The inner lining of the catcher's glove 32 may include 1–2 sheets of laminate structure 25 sewn directly to the glove leather. The shoulder pads 36 illustrated in FIG. 11 are constructed of 10–20 sheets of stacked laminate structure 25 molded in a conventional manner to properly fit the shoulders of the user. Preferably, the above athletic guards do not include additional structure which would substantially add to the overall weight of the product.

In addition to molding, a standard autoclave press or other press machine may be used to shape the athletic guard to fit against the particular body part to be protected. Furthermore, the athletic guard may incorporate any number of sheets of laminate structure 25 depending upon the degree of body protection desired, while achieving a substantially lighter product with enhanced energy absorbing and impact resisting characteristics. After pressing or molding, the resulting athletic guard may be substantially rigid, semi-rigid, or relatively flexible depending upon the amount of laminate structure 25 used, and its relative density.

An athletic guard incorporating a laminate structure is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An athletic guard shaped to fit against a body part for protecting the body part from injury, and comprising an energy absorbing laminate structure, said laminate structure comprising:

(a) a first array of high performance, unidirectionally-oriented fiber bundles;

(b) a second array of high performance, unidirectionally-oriented fiber bundles cross-plied at an angle with respect to said first array of fiber bundles, and laminated to said first array of fiber bundles in the absence of adhesives or bonding agents; and (c) first and second polymeric films bonded to outer surfaces of said laminated first and second arrays of unidirectional fiber bundles without penetration of said films into said fiber bundles or through the laminate from one side to the other, whereby a sufficient amount of film resides between the laminated first and second arrays of unidirectional fiber bundles to adhere the first and second arrays of fiber bundles together to form the laminate structure.

2. An athletic guard according to claim 1, wherein the first array of fiber bundles is cross-plied at an angle of 90 degrees to the second array of fiber bundles.

3. An athletic guard according to claim 1, wherein said first and second thermoplastic films comprise polyethylene film having a thickness of 0.35 mils.

4. An athletic guard according to claim 1, wherein the weight of the high performance fibers in the laminate structure is at least 80 percent of the total weight of the laminate.

5. An athletic guard according to claim 1, wherein said first and second arrays of high performance, unidirectionally-oriented fiber bundles comprising fibers chosen from the group consisting of aramid fiber, ultra high molecular weight polyethylene, high molecular weight polyethylene, high modulus vinylon, and liquid crystal polymer-based fiber.

6. An athletic guard shaped to fit against a body part for protecting the body part from injury, and comprising an energy absorbing laminate structure, said laminate structure comprising:

(a) a first array ofhigh performance, unidirectionally-oriented fiberbundles;

(b) a second array of high performance, unidirectionally-oriented fiber bundles cross-plied at a 90 degree angle with respect to said first array of fiber bundles, and laminated to said first array of fiber bundles in the absence of adhesives or bonding agents;

(c) said first and second arrays of high performance, unidirectionally-oriented fiber bundles comprising fibers chosen from the group consisting of aramid fiber, ultra high molecular weight polyethylene, high molecular weight polyethylene, high modulus vinylon, and liquid crystal polymer-based fiber; and (d) first and second polymeric films bonded to outer surfaces of said laminated first and second arrays of unidirectional fiber bundles without penetration of said films into said fiber bundles or through the laminate from one side to the other, whereby a sufficient amount of film resides between the laminated first and second arrays of unidirectional fiber bundles to adhere the first and second arrays of fiber bundles together to form the laminate structure.

7. An athletic guard shaped to fit against a body part for protecting the body part from injury, and comprising an energy absorbing laminate structure, said laminate structure comprising:

(a) a first array of high performance, unidirectionally-oriented aramid fiber bundles;

(b) a second array of high performance, unidirectionally-oriented aramid fiber bundles cross-plied at right angles with respect to said first array of fiber bundles, and laminated to said first array of fiber bundles in the absence of adhesives or bonding agents; and (c) first and second polyethylene films, each film having a thickness of 0.35 mils bonded to the outer surfaces of said laminated first and second arrays of unidirectional fibers without penetration of said films into fiber bundles or through the laminate from one sheet of fibers to the other, whereby a sufficient amount of film resides between the laminated first and second arrays of unidirectional fiber bundles to adhere the first and second arrays of fiber bundles together to form the ballistic laminate structure.

8. An athletic guard according to claim 7, wherein each of said aramid fiber arrays has 10 bundles per inch of 840 denier, 1.5 denier per filament fiber.

* * * * *